(12) United States Patent
Brown et al.

(10) Patent No.: US 8,922,946 B1
(45) Date of Patent: Dec. 30, 2014

(54) DISK DRIVE WITH BALANCE PLUG HAVING THERMALLY DEFORMABLE PORTION

(75) Inventors: Matthew L. Brown, Palo Alto, CA (US); Joshua P. Weiher, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/476,563

(22) Filed: May 21, 2012

(51) Int. Cl.
*H02K 1/06* (2006.01)
*G11B 17/02* (2006.01)

(52) U.S. Cl.
USPC .................................. 360/99.12; 310/216.117

(58) Field of Classification Search
CPC ....................................................... G01M 1/32
USPC ......... 360/98.08, 99.05, 99.12; 310/216, 117, 310/216.117; 451/343
See application file for complete search history.

(56) References Cited

U.S. PATENT DOCUMENTS

| | | | | |
|---|---|---|---|---|
| 2,927,867 A * | 3/1960 | Hings | ............................ | 428/458 |
| 4,606,953 A * | 8/1986 | Suzuki et al. | .................... | 138/143 |
| 4,903,224 A * | 2/1990 | Namiki et al. | ................... | 720/724 |
| 5,073,217 A * | 12/1991 | Fogal | ............................ | 156/75 |
| 5,130,870 A * | 7/1992 | Jabbari | ......................... | 360/99.08 |
| 5,305,169 A * | 4/1994 | Anderson et al. | ............. | 360/256.2 |
| 5,422,776 A * | 6/1995 | Thorson et al. | ............. | 360/98.07 |
| 5,621,588 A | 4/1997 | Williams et al. | | |
| 6,178,062 B1 | 1/2001 | Yim et al. | | |
| 6,236,540 B1 * | 5/2001 | Meguro | ......................... | 360/133 |
| 6,504,673 B2 | 1/2003 | Choo et al. | | |
| 6,550,328 B1 | 4/2003 | Horning et al. | | |
| 6,741,418 B2 | 5/2004 | Renken | | |
| 6,754,042 B1 | 6/2004 | Chiou et al. | | |
| 6,807,721 B2 | 10/2004 | Choo et al. | | |
| 6,915,527 B2 | 7/2005 | Liao et al. | | |
| 6,947,253 B2 | 9/2005 | Pfeiffer et al. | | |
| 7,064,923 B2 | 6/2006 | Tran et al. | | |
| 7,102,850 B1 | 9/2006 | Buzek et al. | | |
| 7,295,400 B2 | 11/2007 | Tran et al. | | |
| 7,307,813 B1 | 12/2007 | Suwito | | |
| 7,342,746 B1 * | 3/2008 | Lin | ............................. | 360/99.08 |
| 7,446,973 B2 * | 11/2008 | Feliss et al. | ................. | 360/99.12 |
| 7,463,446 B2 | 12/2008 | Elsing | | |
| 7,529,064 B1 | 5/2009 | Huang et al. | | |
| 7,602,583 B2 | 10/2009 | Makita | | |
| 7,630,171 B2 | 12/2009 | Lee et al. | | |
| 8,369,044 B2 * | 2/2013 | Howie et al. | ................ | 360/99.12 |
| 2002/0191332 A1 * | 12/2002 | Elsing | ......................... | 360/99.08 |
| 2006/0119980 A1 * | 6/2006 | Hiramatsu et al. | .......... | 360/99.08 |
| 2006/0230600 A1 * | 10/2006 | Tran et al. | ..................... | 29/603.03 |
| 2007/0263321 A1 * | 11/2007 | Chan et al. | .................... | 360/99.12 |
| 2008/0024925 A1 * | 1/2008 | Shikano | ........................ | 360/244 |
| 2008/0037165 A1 | 2/2008 | Nguyen et al. | | |
| 2011/0170215 A1 * | 7/2011 | Han et al. | ..................... | 360/99.12 |
| 2012/0002324 A1 * | 1/2012 | Howie et al. | ................ | 360/99.12 |

OTHER PUBLICATIONS

U.S. Appl. No. 12/826,671, dated Jun. 30, 2010 to German, et al.

* cited by examiner

*Primary Examiner* — Adam B Dravininkas

(57) ABSTRACT

A disk drive having a spindle hub, a disk clamp, coupled to the spindle hub, the disk clamp having an aperture, and a balance plug inserted through the aperture of the disk clamp is described herein. The balance plug has a thermally deformable portion that is deformed to retain the balance plug between the spindle hub and the disk clamp.

19 Claims, 6 Drawing Sheets

DISK DRIVE WITH BALANCE PLUG HAVING THERMALLY DEFORMABLE PORTION

FIELD

The present disclosure relates generally to information storage devices, and in particular to a disk drive having a balance plug with a thermally deformable portion.

BACKGROUND

Hard disk drives (HDD) are frequently used to record and reproduce data from a recording media in electronic devices, such as computers. Recording media used in an HDD can include a disk having one or more recording surfaces. The HDD usually also includes a head that reads and writes data on one of the recording surfaces disk. The head is moved over a desired location or track of the disk by an actuator.

A spindle motor in the HDD usually rotates the disk during operation. During the operation of the HDD, the head is moved by the actuator over the disk and the head floats a predetermined height above the recording surface of the disk while the disk is rotated, and the head detects and/or modifies the recording surface of the disk to retrieve, record, and/or reproduce data from and/or onto the disk.

When HDD is not being operated, or when the disk is not rotating, the actuator moves the head to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
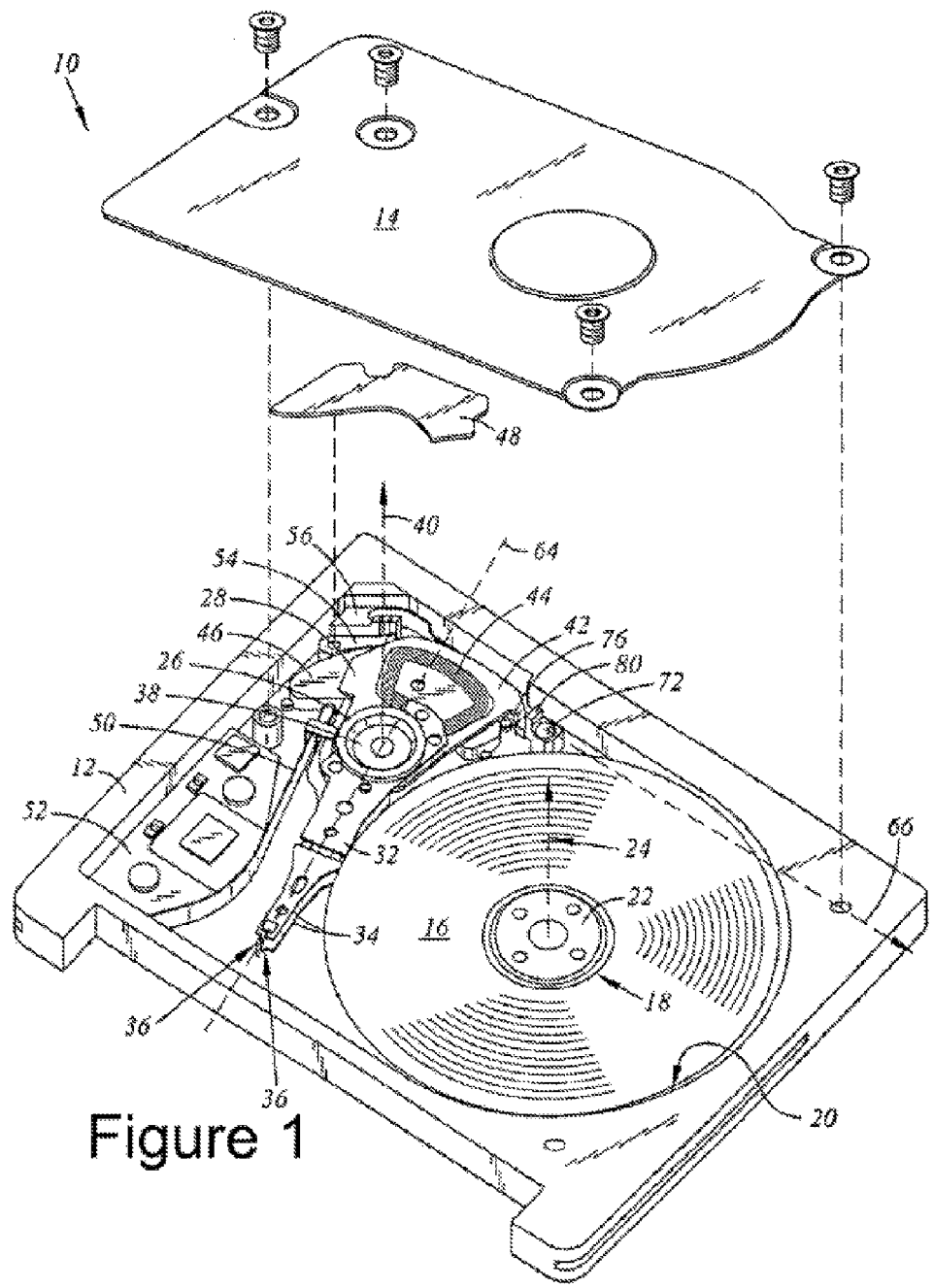
FIG. 1 depicts a perspective view of a disk drive in accordance with one embodiment.

Referring now to FIG. 1, there is depicted an exploded perspective view of a disk drive 10 according to an embodiment described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device; however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating rotation of the actuator body about axis of rotation 40 between limited positions.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a fixed portion 56 that is firmly coupled to the disk drive base 12. The latch 54 further includes a latching portion that is engagable with the fixed portion 56 to limit rotational movement of the actuator 28. Although the latch 54 is depicted as being located in a corner of the base, the latch 54 could be located in other portions of the disk drive and still perform its functions.

When the actuator 28 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto the disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of the HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity of the actuator arm 32 relative to the disk 16 can adversely affect the performance of the HDD. For example, vibration of the actuator 28 can result in variations in the spacing between the head element and media. Additionally, irregular movement of the disk 16, or vibrations caused by unbalanced rotations, can result in variations in the spacing between the head element and the disk 16, or media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Figure 2:
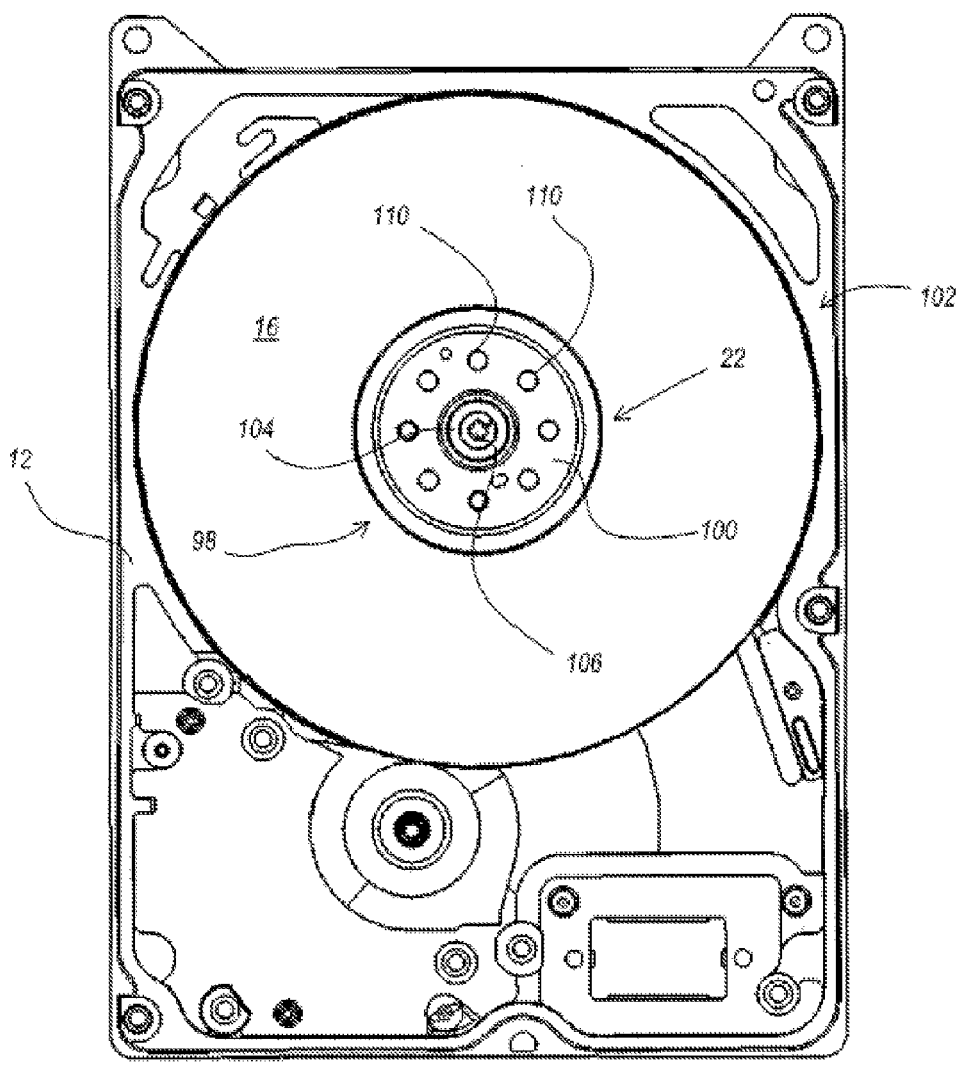
FIG. 2 illustrates a top view of a disk drive in accordance with one embodiment.

Each disk 16 is mounted on a rotatable hub 98 connected to the spindle motor 22 and is secured to the rotatable hub by a disk clamp 100, as illustrated in FIG. 2. Some disk drives 10 include a plurality of disks 16 to provide additional disk surface for storing greater amounts of data. The resulting combination is referred to herein as a motor/disk assembly or as a disk pack 102.

Multiple data storage disks 16 can be mounted on the rotatable hub 98 in vertically and substantially equally spaced relations. One or more bearings 104 are disposed between a motor or spindle shaft 106 and the rotatable hub 98, which is disposed about and rotatable relative to the spindle shaft 106. Electromagnetic forces are used to rotate the hub 98 about the stationary shaft 106 at a desired velocity. Rotational movement of the hub 98 is translated to each of the disks 16 of the disk pack 102, causing the disks 16 to rotate with the hub 98 about the shaft 106.

The disks 16 are rotated about the shaft 106 at a high rate of speed, and consumer demand for quicker data retrieval can result in increased rotational speed of the hub 98 and the disks 16 to provide reduced time in accessing data. Even minor imbalances of the rotating motor/disk assembly 102 can generate significant forces that can adversely affect the ability to accurately position the head 36 relative to the desired track of the corresponding disk 16 while reading from or writing to the disk 16. Excessive imbalance can degrade the disk drive performance not only in terms of read/write errors, but also in terms of seek times. Excessive imbalance may result in an undesirable acoustic signature and may even result in damage or excessive wear to various disk drive components.

The inner diameter 18 of each disk 16 is slightly larger in diameter than an outer periphery of the spindle motor hub, or rotatable hub 98, in order to allow the disks 16 to slip about the spindle motor hub 98 during installation. During assembly, the disks 16 may be positioned in an inexact concentric manner about the spindle motor hub 98. In fact, in some instances, the disks 16 may be intentionally biased against the spindle motor hub 98. This inexact concentric relationship between the disk 16 and the motor hub 98 results in the disk pack 102 becoming imbalanced. This imbalance can be manifest in at least two respects.

First, the rotating mass of each disk 16 results in a centrifugal force radially extending in a direction from the axis of rotation 24 in a plane orthogonal to the axis of rotation 24. This can be referred to as a single plane or "static" imbalance. Second, the same centrifugal force also results in a moment about an axis, extending from the axis of rotation 24, as a result of the coupling of two different planes of imbalance, each of which are orthogonal to the axis of rotation 24. This can referred to as a dual plane, two plane, or "dynamic" imbalance.

Balancing of the disk pack 102 may be conducted, for example, by the manufacturer or during an assembly process, prior to shipping the drive 10 to the consumer. Single plane balancing of the disk pack 102 can include attaching one or more weights to one side of the disk pack 102. Not all imbalances may be alleviated to the desired degree by balancing within a single plane. Dual plane balancing of the disk pack 102 can be achieved by attaching one or more weights at two different elevations along the axis 24 corresponding with vertically spaced reference planes in an attempt to improve upon the potential inadequacies of a single plane balance.

Balancing the disk pack 102 can be accomplished by attaching one or more weights to a central portion of the disk pack 102. For example, as illustrated in FIG. 2, the disk pack 102 can have a portion that holds the one or more weights or to which the one or more weights attach. FIG. 2 illustrates a disk pack 102 having a rotatable hub 98 that includes a disk clamp 100 having a plurality of disk clamp apertures 110 positioned circumferentially about a central portion of the disk pack 102.

The disk clamp apertures 110 can be, as illustrated in FIG. 2, substantially equidistant from, or equally spaced about, from the axis of rotation 24. For example, a plurality of the disk clamp apertures 110 can be positioned about the axis of rotation 24 on a common reference circle having its center coinciding with the axis of rotation 24. The plurality of disk clamp apertures 110 can also include apertures that are positioned at different radial distances from the axis of rotation 24 than others of the plurality of disk clamp apertures.

In one embodiment, the disk clamp 100 includes eight disk clamp apertures 110 that are positioned about the axis of rotation 24. The disk clamp 100 can include between about four disk clamp apertures 110 and about eight disk clamp apertures 110. In one embodiment, the disk clamp 100 can include less than four disk clamp apertures 110, and in some embodiments, the disk clamp 100 can include more than eight disk clamp apertures 110.

The disk clamp apertures 110 can be designed to be substantially the same size, and in some embodiments, the disk clamp apertures 110 can be designed to have apertures of different sizes. The different sized apertures can be positioned with different radial distances as apertures of different sizes, or the different sized apertures can be positioned with equal radial distances from the axis of rotation than apertures of different sizes.

When balancing the disk pack 102, one or more weights can be placed within one or more of the disk clamp apertures 110 in order to stabilize the disk pack 102 during operation. One or more weights can be used to offset imbalances that are generated during operation of the disk drive 10. For example, if imbalances are created by rotational movement of the disk pack 102 during operation of the disk drive 10, one or more weights can be placed within disk clamp apertures 110 in order to offset the imbalance created by rotational movement of the disk pack 102.

Figure 3:
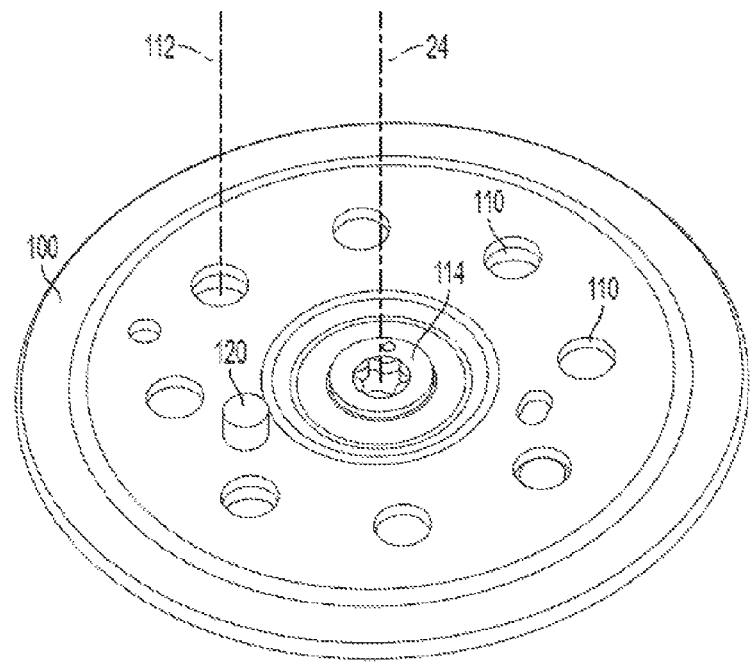
FIG. 3 illustrates a perspective view of a disk pack in accordance with one embodiment.

FIG. 3 illustrates a partially exploded view that includes a disk clamp 100 that can be positioned on a disk pack 102 that includes one or more disks 16. As explained, the disk clamp 100 can include a plurality of disk clamp apertures 110 positioned about the axis of rotation 24. As depicted in FIG. 3, the disk clamp apertures 110 can be positioned with substantially equal radial distances from the axis of rotation 24, such that the disk clamp apertures 110 are positioned along a common reference circle that has its center substantially coinciding with the axis of rotation 24.

Each of the disk clamp apertures 110 defines a disk clamp aperture axis 112 that extends substantially through the respective disk clamp aperture 110. The disk clamp aperture axis 112 of each of the respective disk clamp apertures 110 can be substantially parallel to the axis of rotation 24. In some embodiments, the disk clamp aperture axis 112, of one or more of the disk clamp apertures 110 can be positioned at angles relative to the axis of rotation 24. For example, in some embodiments, the disk clamp aperture axis 112 can be positioned at an angle of between about 20° to about 80° relative to the axis of rotation 24, and in some embodiments, the disk clamp aperture axis 112 can be positioned at an angle of between about 30° to about 50° relative to the axis of rotation 24.

In one embodiment, the disk clamp apertures 110 are positioned symmetrically about the axis of rotation 24. In some embodiments, the disk clamp 100 can include disk clamp apertures 110 that are positioned asymmetrically about the axis of rotation 24. And in some embodiments, the disk clamp 100 can include some disk clamp apertures 110 that are symmetrically about the axis of rotation 24 and other disk clamp apertures 110 that are positioned asymmetrically about the axis of rotation 24.

A fastener 114 can be provided to secure the disk clamp 100 to the disk pack 102. As illustrated in FIG. 3, the fastener 114 can be positioned to be substantially aligned with the axis of rotation 24. The fastener 114 is threadingly received by an internal bore in the shaft 106.

FIG. 3 depicts a balance plug 120 that can be positioned in one or more of the disk clamp apertures 110 to balance the disk pack 102. As illustrated, the balance plug 120 is configured to be sized such that it can be received within, and/or through, the disk clamp aperture 110. Although FIG. 3 depicts only one balance plug 120 being received within a disk clamp aperture 110, the disk pack 102 can include a plurality of balance plugs 120 that are received into at least one of the disk clamp apertures 110.

Figure 4:
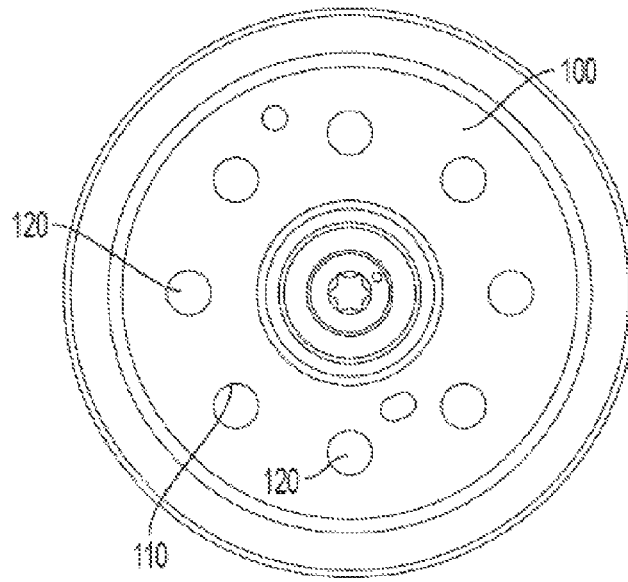
FIG. 4 illustrates a top view of a disk clamp in accordance with one embodiment.

FIG. 4 illustrates a top view of the disk clamp 100 with a plurality of balance plugs 120 residing within a plurality of disk clamp apertures 110. As illustrated in the embodiment depicted in FIG. 4, the disk clamp 100 can include a plurality of disk clamp apertures 110 that are positioned in symmetrical fashion about a central portion of the disk clamp 100. While the disk clamp apertures 110 are positioned in symmetrical fashion, positioning of the balance plugs 120 within select disk clamp apertures 110 do not need to be symmetrical.

Figure 5:
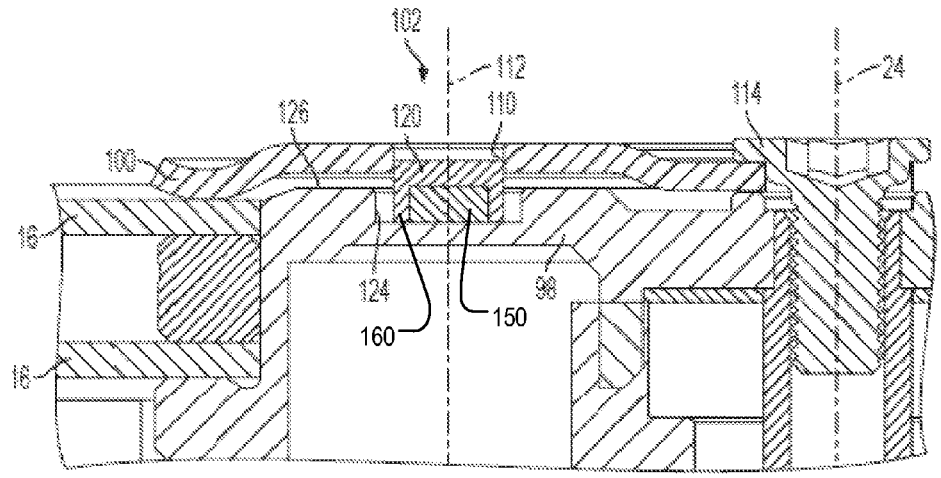
FIG. 5 illustrates a partial cross-sectional view of a disk pack in accordance with one embodiment with a balance plug being shown in a non-deformed state.

FIG. 5 illustrates a partial cross-sectional view of a portion of the disk pack 102 that includes a rotatable motor hub 98 and a motor or spindle shaft 106 positioned about an axis of rotation 24. The disk at 102 can include a plurality of disks 16 that are secured in position by a disk clamp 100. The disk clamp 100 can include a plurality of disk clamp apertures 110 that are positioned about the disk clamp 100 at a radial distance from the axis of rotation 24.

A motor hub recess 124 can extend from a top surface 126 of the motor hub 98. As illustrated, in one embodiment, the motor hub recess 124 extends into the motor hub 98 but does not extend to a bottom surface 128 of the motor hub 98. The motor hub 98 can include a plurality of motor hub recesses 124 that are positioned about the axis of rotation.

In one embodiment, each of the plurality of motor hub recesses 124 is positioned about the axis of partition 24 at a radial distance that is substantially the same as others of the plurality of motor hub recesses 124. The motor hub recesses 124 can be positioned symmetrically about the axis of rotation, and in some embodiments, the motor hub 98 can include motor hub recesses 124 that are positioned asymmetrically about the axis of rotation 24. The motor hub recesses 124 can be positioned about the axis of rotation 24 such that each of the motor hub recesses 124 is aligned along a common reference circle cutting its center substantially coinciding with the axis of rotation 24. In some embodiments, the motor hub recess 124 can extend into the motor hub 98 in a direction that is substantially parallel to the axis of rotation 24.

As illustrated in FIG. 5, the disk clamp 100 is positioned rotationally about the axis of rotation 24 such that at least one disk clamp aperture 110 is substantially aligned with at least one motor hub recess 124. In some embodiments, this orientation will permit insertion of a balance plug 120 inserted through the disk clamp aperture 110 and receipt of the balance plug 120 into at least a portion of the motor hub recess 124.

As illustrated in FIG. 5, the balance plug 120 includes a thermally deformable portion 160 and, optionally, a non-thermally deformable portion 150. In some embodiments, the thermally deformable portion 160 can have a u-shape that surrounds the non-thermally deformable portion 150 on all but one side. For example as shown in FIG. 5, the balance plug 120 can be formed as a cylinder and the non-thermally deformable portion 150 is surrounded by the thermally deformable portion 160 on the sides and one end face, but no covered by the thermally deformable portion 160 on one end face.

Figure 8:
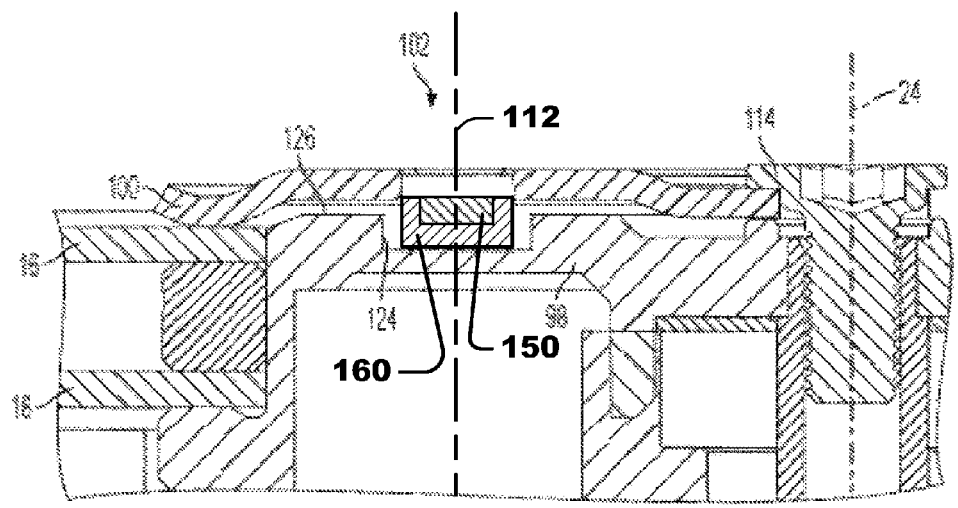
FIG. 8 illustrates a partial cross-sectional view of a disk pack in accordance with a second embodiment with a balance plug being shown in a non-deformed state.

Though the open face of the non-thermally deformable portion 150 is shown in FIG. 5 as being a bottom face of the balance plug 120, the orientation of the balance plug 120 when inserted through the disk clamp aperture 110 is no limited to this orientation. For example, and not by way of limitation, the balance plug 120 could be inserted through the disk clamp aperture 110 with the open face of the non-thermally deformable portion 150 being a top face of the balance plug 120 as illustrated in FIG. 8. Further, though the balance plug 120 is shown having a cylindrical shape the shape of the balance plug is not limited to a cylindrical shape.

Figure 9:
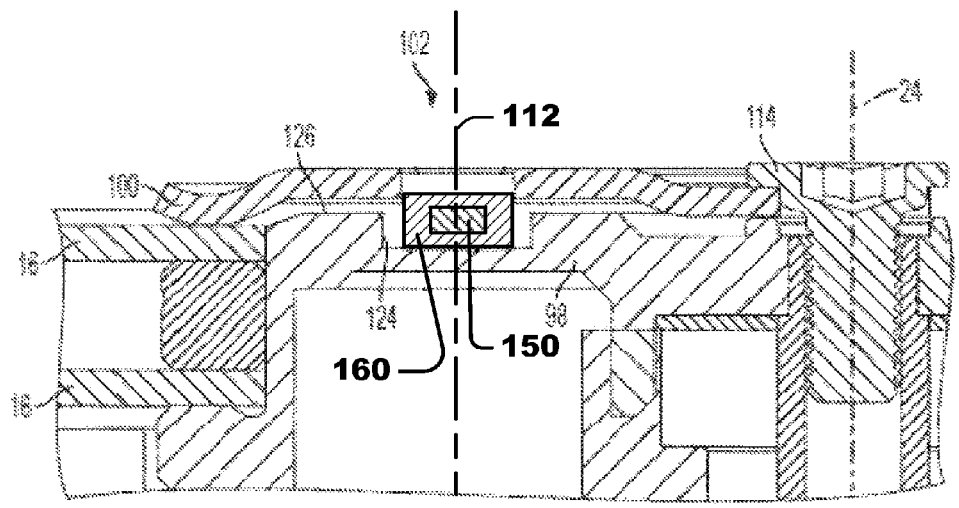
FIG. 9 illustrates a partial cross-sectional view of a disk pack in accordance with a third embodiment with a balance plug being shown in a non-deformed state.

Further, the balance plug is not particularly limited to a substantially u-shaped configuration. For example, the balance plug could alternatively be formed such that the non-thermally deformable portion is formed a central core and the thermally deformable portion is formed as a shell that surrounds the central core (non-thermally deformable portion) on all sides as illustrated in FIG. 9. Additionally, the balance plug could also be formed to have any other shape as would be apparent to a person of ordinary skill in the art.

In one embodiment, the balance plug 120 includes a cross-sectional dimension that is less than a cross-sectional dimension of at least one of the disk clamp aperture 110 and the motor hub recess 124. For example, in one embodiment, the balance plug 120 can include a cross-sectional dimension, which can be a diameter of the balance plug 120 that is less than a cross-sectional dimension, which can be a diameter of the motor hub recess 124. In another example, in one embodiment, the balance plug 120 can include a cross-sectional dimension, which can be a diameter of the balance plug 120 that is less than a cross-sectional dimension, which can be a diameter, of the disk clamp aperture 110.

In some embodiments, the thermally deformable portion 160 is formed of plastic material, such as Acrylonitrile butadiene styrene (ABS) Plastic or Polyetherimide (PEI) plastic, and the non-thermally deformable portion 150 is formed of a metal material, such as stainless steel or other non-reactive metal. However, the material of the thermally deformable portion 160 is not limited to plastic materials and the material of the non-thermally deformable portion 150 is also not limited to metal. Instead, in some embodiments, the materials of the thermally deformable portion 160 and the non-thermally deformable portion 150 can be selected such that the thermally-deformable portion deforms at a selected temperature and the non-thermally deformable portion 150 does not deform at the selected temperature.

In some embodiments, when the balance plug 120 is received into the disk clamp aperture 110, and in some embodiments into the motor hub recess 124, the balance plug 120 is threaded through the disk clamp aperture 110 and sits in the motor hub recess 124. During assembly of some embodiments, the balance plug 120 freely passes through the disk clamp aperture 110 and may be received within the motor hub recess 124 in some embodiments, due to the smaller cross-sectional dimension of the balance plug 120.

After the balance plug 120 is inserted through the disk clamp aperture 110, and received within the motor hub recess 124 in some embodiments, heat may be applied directly to the balance plug 120 to cause the thermally deformable portion 160 to transition into a liquid or semi-solid state and deform outwardly around the non-thermally deformable portion 150. After the thermally deformable portion 160 has been deformed outwardly from the non-thermally deformable portion 150, the heat may be removed and the thermally deformable portion 160 may be allowed to cool and transition back into a solid state. Once the thermally deformable portion 160 has transitioned back to a solid state, the deformed shape of the thermally deformable portion remains.

The apparatus for applying heat to the balance plug 120 is not particularly limited and may include a heat stick, laser device or any other apparatus capable of applying heat directly to the balance plug 120. The heating temperature is not particularly limited and can be any temperature sufficient to cause deformation of the thermally deformable portion 160 of the balance plug 120 without deforming the non-thermally deformable portion of the balance plug. Further, the heating time is not particularly limited and can be any time sufficient to allow the thermally deformable portion 160 to deform outward from the non-thermally deformable portion. For example, and not by way of limitation, a temperature greater than 200° C. and less than 300° C. applied directly to a balance plug 120 for less than is may be sufficient to cause deformation of a balance plug 120 having a thermally deformable portion 160 formed of ABS plastic. Other heating temperatures and heating times may be used for different materials. However, excessively large heating temperature and heating times may cause adverse effects to other parts of the HDD, such as warping, bending, or cracking.

Figure 6:
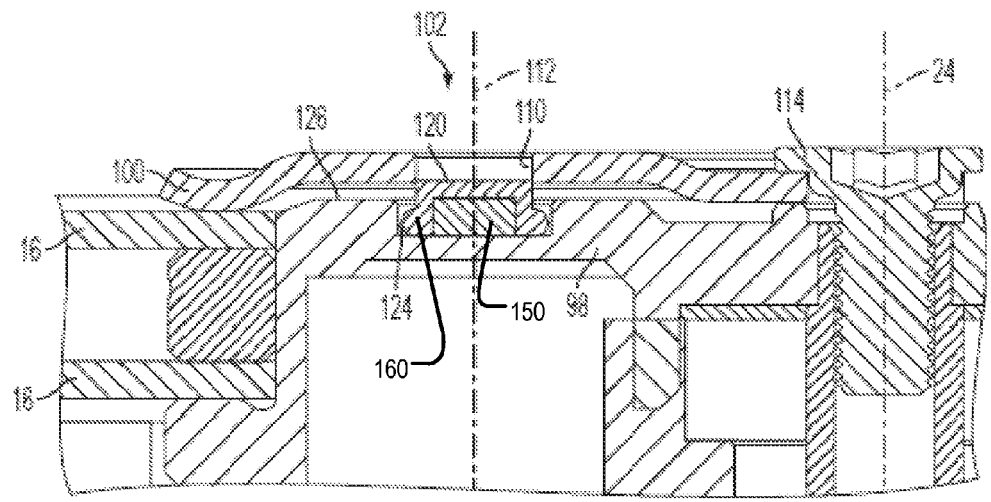
FIG. 6 illustrates a partial cross-sectional view of a disk pack in accordance with one embodiment with a balance plug being shown in a deformed state.

FIG. 6 illustrates a partial cross-sectional view of an embodiment with the thermally deformable portion of the balance plug 120 being shown in a deformed state. In some embodiments, the deformation of the thermally deformable portion 160 causes the cross-sectional dimension of the balance plug 120 to change. Specifically, prior to the deformation of the thermally deformable portion 160, the balance plug 120 has a diameter smaller than the disk clamp aperture 110. However, after the deformation of the thermally deformable portion 160, the balance plug 120 has a diameter larger than the disk clamp aperture 110 because the thermally deformable portion transitioned into a liquid or semi-solid shape during heating and expanded radially outward from the non-thermally deformable portion 150.

Though the deformation of the thermally deformable portion 160 is shown as being symmetric, the deformation need not occur symmetrically. Once the balance plug 120 has cooled and the thermally deformable portion 160 transitioned back to a solid state, the diameter of the balance plug 120 has been increased. As the diameter of the balance plug 120 is larger than the diameter of the clamp aperture 110, the balance plug 120 cannot pass through the disk clamp aperture 110 after deformation and is thus retained under the disk clamp 100 by the deformable portion 160. This configuration can limit the movement of the balance plug 120 within at least one of the disk clamp aperture 110 and the motor hub recess 124 and can further secure the balance plug 120 against an inadvertent dislodging of the balance plug 120 from its desired location or positioning within the disk pack 102.

Figure 7:
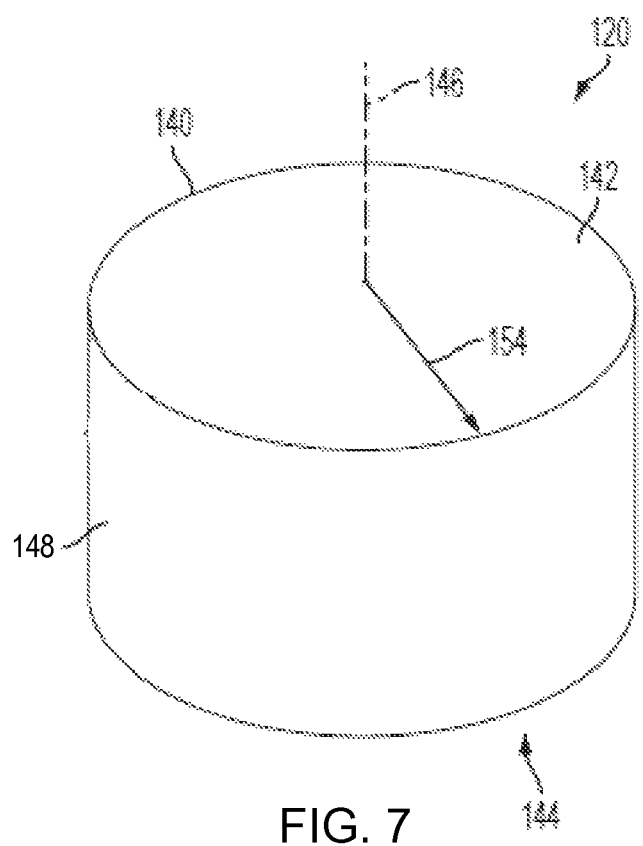
FIG. 7 illustrates one embodiment of a balance plug.

FIG. 7 illustrates one embodiment of the balance plug 120 that can be used in connection with embodiments described in this disclosure. The balance plug 120 includes a cylindrical body 140 that defines a top surface 142 and a bottom surface 144. The cylindrical body 140 also defines a cylindrical body axis 146 that extends through a substantially central portion of the balance plug 120. Extending about a periphery of the cylindrical body 140 is an outer surface 148. The cylindrical body 140 of the balance plug 120 has a radial dimension 154. Though a balance plug 120 having a cylindrical body 140 is shown, the balance plug is not limited to a cylindrical body 140 and can have any shape.

In some embodiments, the disk pack 102 can have balance plugs 120 that all have the same or substantially the same mass. In some embodiments, the disk pack 102 can have balance plugs 120 of different sizes and/or of different mass. For example, in some embodiments, the balance plugs 120 can have the same size and have different masses that can be determined based on the desired effect that will be created when inserted into the disk pack 102. As another example, the balance plugs 120 can have different sizes and have the same mass, which can also be determined based on how the plug 120 will affect performance of the disk pack 102. In yet another example, the balance plugs 120 can be of differing sizes and differing masses.

Further, in some embodiments, the mass of the balance plug 120 can be adjusted without changing the volume of the balance plug 120 by adjusting the sizes of the thermally deformable portion 160 and the non-thermally deformable portion 150, which may be formed of different materials having different masses. For example, and not by way of limitation, in some embodiments the thermally deformable portion 160 may be formed of a plastic, such as ABS plastic, having a density of approximately 1.05 g/cm$^3$ and the non-thermally deformable portion 150 may be formed of a metal, such as stainless steel, having a density of approximately 8 g/cm$^3$. As the density of the non-thermally deformable portion 150 is greater (about 7.5 times) than the density of the thermally deformable portion in some embodiments, a change in the ratio of the volume of the thermally deformable portion 160 to the volume of the non-thermally deformable portion 150 can change the overall mass of balance plug 120 without changing the total volume of the balance plug 120.

In one embodiment, the disk drive 10 can include a spindle hub 98 having a top surface 126. The drive can also include a disk clamp 100, coupled to the spindle hub 98, and the disk clamp 100 can have disk clamp, aperture 110 that is positioned substantially over the top surface 126 of the spindle hub 98 such that the plug aperture 110 defines an aperture axis 112 that extends through the plug aperture 110 and the top surface 126. The drive 10 can also include a balance plug 120. In one embodiment, the balance plug 120 includes opposing ends 142, 144 and an outer surface 148 that defines a central axis 146 of the plug 120. The plug 120 can also have that includes a thermally deformable portion 160 and a non-thermally deformable portion 150. The plug 120 is sized and configured to pass through the plug aperture 110 easily.

In one embodiment, the top surface 126 further includes at least one plug recess 124 that is configured to receive at least a portion of the balance plug 120 when the balance plug is received through the plug aperture 110. In some embodiments, the plug is sized such that the opposing ends of the plug are positioned below a top surface of the disk clamp 100 when the plug is received through the plug aperture 110. The plug 120 is sized, in some embodiments, such that, the plug 120 passes through the plug aperture without resistance and sites in the plug recess 124 with a gap on at least one sides of the balance plug 120. After the balance plug 120 is seated in the plug recess 124, heat is applied to the balance plug 120 causing the thermally deformable portion 160 to deform outward and fill the gap on the at least one side of the balance plug 120.

Some embodiments provide that the plug 120 comprises only the thermally deformable portion and a non-thermally deformable portion is omitted. In these embodiments, the balance plug 120 is formed of a single, uniform material. In some embodiments, this single uniform material is a polymer such as ABS.

In other embodiments, the balance plug 120 comprises both a thermally deformable portion and a non-thermally deformable portion and thus, the balance plug 120 can be made of a plurality of materials. For example, the plug 120 can, in some embodiments, have a metal center piece (non-thermally deformable portion 150) and a polymer provided over the metal, to form the thermally deformable portion 160. In some embodiments, the balance plug 120 can be manufactured such that the material of the non-thermally deformable portion 150 and the material of thermally deformable portion 160 have different densities and different melting or softening temperatures. In another example, the plug 120 can be made of two different polymers, with one polymer forming the thermally deforming portion, which has a lower melting or softening temperature than a second polymer that forms the non-thermally deforming portion.

Some embodiments provide a method of balancing a disk pack in a disk drive that can include the steps of providing a disk drive having a spindle hub 98 with a top surface 126 and providing a disk clamp 100 having a disk clamp aperture 110 positioned substantially over the top surface 126 of the spindle hub 98 such that the plug aperture 110 defines an aperture axis 112 that extends through a portion of the top surface 126 and the plug aperture 110. The method further includes providing a substantially cylindrical balance plug 120 having opposing ends 142, 144 and a substantially cylindrical outer surface 148 that defines a central axis 146 of the plug 120. The provided balance plug 120 can include a thermally deformable portion 160 and a non-thermally deformable portion 150. The density of the non-thermally deformable portion 160 may be greater than the density of the thermally deformable portion 150. The method further includes inserting the plug through the plug aperture 110 and applying heat to the balance plug to cause the thermally deformable portion 160 to deform. In some embodiments, the plug is retained between the disk clamp 100 and the spindle hub 98 by the deformation of the thermally deformable portion 160 of the balance plug 120, because the deformation of the thermally deformable portion 160 of the balance plug 120 extends in a direction substantially perpendicular to the central axis 146 of the balance plug 120.

The method can further include positioning the balance plug 120 with the thermally deformable portion 160 disposed above the non-thermally deformable portion 150. Alternative, the method can include positioning the balance plug with the thermally deformable portion disposed beneath the non-thermally deformable portion. The method may also include adjusting a mass of the balance plug 120 without changing the volume of the balance plug 120 by changing a ratio of the volume of the thermally deformable portion 160 to the volume of the non-thermally deformable portion 150.

The description of the disclosure is provided to enable any person skilled in the art to practice the various embodiments described herein. While the embodiments have been particularly described with reference to the various figures and disclosure, it should be understood that these are for illustration purposes only and should not be taken as limiting the scope of the embodiments.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
    a spindle hub;
    a disk clamp, coupled to the spindle hub, the disk clamp having an aperture; and
    a balance plug configured to be inserted through the aperture of the disk clamp,
    wherein the balance plug is configured to be deformed from a non-deformed state to a deformed state by thermal energy;
    wherein the balance plug comprises a thermally deformable portion, the deformable portion being deformed to retain the balance plug between the spindle hub and the disk clamp in the deformed state of the balance plug, and
    wherein the balance plug further comprises a substantially smooth and uniform outer circumferential surface along substantially an entire height of the balance plug with no protrusions in the non-deformed state of the balance plug.

2. The disk drive of claim 1, wherein the thermally deformable portion in the non-deformed state has a dimension smaller than the plug aperture, and
    wherein the thermally deformable portion in the deformed state has a dimension larger than the plug aperture.

3. The disk drive of claim 1, wherein the thermally deformable portion in the non-deformed state snugly fits through the plug aperture, and wherein the thermally deformable portion in the deformed state does not fit through the plug aperture.

4. The disk drive of claim 1, wherein the thermally deformable portion comprises plastic.

5. The disk drive of claim 4, wherein the thermally deformable portion is formed from a thermoforming plastic.

6. The disk drive of claim 1, wherein the balance plug further comprises a non-thermally deformable portion.

7. The disk drive of claim 6, wherein the thermally deformable portion comprises plastic, and the non-thermally deformable portion comprises metal.

8. The disk drive of claim 6, wherein the balance plug is formed with the thermally deformable portion substantially surrounding the non-thermally deformable portion.

9. The disk drive of claim 6, wherein the thermally deformable portion is shaped with a substantially U-shape around the non-thermally deformable portion.

10. The disk drive of claim 6, wherein the balance plug is inserted through the aperture of the disk clamp with the thermally deformable portion positioned above the non-thermally deformable portion.

11. The disk drive of claim 6, wherein the balance plug is inserted through the aperture of the disk clamp with the thermally deformable portion positioned beneath the non-thermally deformable portion.

12. The disk drive of claim 6, wherein the balance plug is formed with the non-thermally deformable portion being a central core, and the thermally deformable portion being a shell, which surrounds the non-thermally deformable portion.

13. The disk drive of claim 6, wherein the balance plug has a substantially cylindrical shape with the thermally deformable portion formed on a first side of the cylindrical shape and the non-thermally deformable portion formed on a second, opposite side of the cylindrical shape.

14. The disk drive of claim 13, wherein the balance plug is inserted through the aperture of the disk clamp with the first side on which the thermally deformable portion is formed positioned above the second side on which the non-thermally deformable portion is formed.

15. The disk drive of claim 13, wherein the balance plug is inserted through the aperture of the disk clamp with the first side on which the thermally deformable portion is formed positioned beneath the second side on which the non-thermally deformable portion is formed.

16. The disk drive of claim 13, wherein the balance plug is formed with the non-thermally deformable portion being a central core, and the thermally deformable portion being a shell, which surrounds the non-thermally deformable portion.

17. The disk drive of claim 6, wherein the non-thermally deformable portion has a density greater than a density of the thermally deformable portion.

18. The disk drive of claim 6, wherein the thermally deformable portion is formed from a thermoforming plastic and the non-thermally deformable portion is formed from a non-reactive metal.

19. The disk drive of claim 1, wherein the spindle hub has a plug recess formed thereon;
    wherein the aperture of the disk clamp is substantially aligned with the plug recess of the spindle hub; and
    wherein the thermally deformable portion of the balance plug secures in the recess of the spindle hub.

* * * * *